United States Patent
Ito et al.

(10) Patent No.: US 8,229,000 B2
(45) Date of Patent: Jul. 24, 2012

(54) MOVING IMAGE CONVERSION METHOD, MOVING IMAGE CONVERSION APPARATUS, MOVING IMAGE CONVERSION SYSTEM, AND SERVER APPARATUS, AND PROGRAM

(75) Inventors: Hironori Ito, Tokyo (JP); Kazunori Osawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1392 days.

(21) Appl. No.: 11/661,805

(22) PCT Filed: Sep. 5, 2006

(86) PCT No.: PCT/JP2006/317549
§ 371 (c)(1),
(2), (4) Date: Mar. 1, 2007

(87) PCT Pub. No.: WO2007/043256
PCT Pub. Date: Apr. 19, 2007

(65) Prior Publication Data
US 2009/0232223 A1    Sep. 17, 2009

(30) Foreign Application Priority Data

Oct. 12, 2005    (JP) .................. 2005-297701

(51) Int. Cl.
*H04N 7/12* (2006.01)
(52) U.S. Cl. ......... 375/240.25; 375/240.12; 375/240.13; 375/240.14; 375/240.24; 48/462; 48/423.1
(58) Field of Classification Search ............ 375/240.13, 375/240.24, 240.26, 240.12–14, 240.25; 381/97–98; 348/462, 423.1
See application file for complete search history.

(56) References Cited

U.S. PATENT DOCUMENTS

| | | | |
|---|---|---|---|
| 6,339,760 B1 | 1/2002 | Koda et al. | |
| 6,654,421 B2 * | 11/2003 | Hanamura et al. | ....... 375/240.26 |
| 6,885,703 B1 | 4/2005 | Funaya et al. | |
| 2001/0006562 A1 | 7/2001 | Tajime | |

(Continued)

FOREIGN PATENT DOCUMENTS

EP    1 209 911    5/2002
(Continued)

OTHER PUBLICATIONS

Woo-Jin Han, Improved Video Compression Efficiency Through Flexible Unit Representation and Corresponding Extension of Coding Tools, Date of Publication: Dec. 2010; Digital Media & Commun. R&D Center, Samsung Electron.,vol. 20, Issue: 12 on pp. 1709-1720.*

(Continued)

*Primary Examiner* — Taghi Arani
*Assistant Examiner* — Angela Holmes
(74) *Attorney, Agent, or Firm* — Young & Thompson

(57) ABSTRACT

An apparatus and method are provided for enabling inhibition or reduction in the amount of processing to decode and to re-encode image data to be compatible with a transmission capacity upon delivery of converted images. Image data converter 205 converts and transfers an image of a conversion start frame in an intra-mode. Switch 206 transfers the image in the intra-mode, which was transferred by image data converter 205, as the conversion start frame, and transfers image data 103 demultiplexed from received data 100 for the remaining frames. Data synchronization/output unit 208 establishes the synchronization of image with audio by temporally adjusting audio data backward when the converted image data increases in size.

12 Claims, 2 Drawing Sheets

U.S. PATENT DOCUMENTS

2001/0033619 A1 10/2001 Hanamura et al.
2004/0234140 A1* 11/2004 Nonaka .......................... 382/232
2005/0008171 A1* 1/2005 Hosoi et al. ..................... 381/98

FOREIGN PATENT DOCUMENTS

| JP | 5-95547 | 4/1993 |
| JP | 06-276427 | 9/1994 |
| JP | 7-111620 | 4/1995 |
| JP | 8-102937 | 4/1996 |
| JP | 9-37204 | 2/1997 |
| JP | 11-088847 | 3/1999 |
| JP | 2000-78531 | 3/2000 |
| JP | 2001-128164 | 5/2001 |
| JP | 2001-186517 | 7/2001 |
| JP | 2001-238169 | 8/2001 |
| JP | 2001-251616 | 9/2001 |
| JP | 2002-290969 | 10/2002 |
| JP | 2002-300528 | 10/2002 |
| JP | 2002-314940 | 10/2002 |
| WO | 02/35853 | 5/2002 |
| WO | 2004/062291 | 7/2004 |

OTHER PUBLICATIONS

Kuo, C.-H,Efficient two-pass rate control scheme based on adjusting distribution of discrete cosine transform coefficients.,IET Image Processing; Jun. 2010, vol. 4 Issue 3, p. 211-222, 12p, 1 Black and White Photograph, 2 Diagrams, 9 Charts, 5 Graphs.*

ILPS: a scalable multiple description coding scheme for H.264 Lorenzo Favalli, Marco Folli. Multimedia Tools and Applications. Dordrecht: Sep. 2011. vol. 54, Iss. 3; p. 609.*

Japanese Office Action dated Dec. 8, 2010 in corresponding Japanese Application No. 2006-552406 with English translation of enclosed wavy lined portion.

Vetro A et al.: "Rate-Reduction Transcoding Design for Wireless Video Streaming" Wireless Communications and Mobile Computing, Wiley, Chichester, GB, vol. 2, No. 6, Sep. 1, 2002, pp. 625-641, XP008015189.

European Patent Office issued an European Search Report dated Mar. 31, 2010, Application No. 06797454.3.

* cited by examiner

TEMPORAL RELATIONSHIP BETWEEN THE IMAGE AND SOUND UPON RECEPTION

TEMPORAL RELATIONSHIP BETWEEN THE IMAGE AND SOUND UPON TRANSFER

MOVING IMAGE CONVERSION METHOD, MOVING IMAGE CONVERSION APPARATUS, MOVING IMAGE CONVERSION SYSTEM, AND SERVER APPARATUS, AND PROGRAM

TECHNICAL FIELD

The present invention relates to moving image conversion techniques, and more particularly, to a moving image conversion method and apparatus, and a system and a computer program.

BACKGROUND ART

Recently, television telephone services and moving image delivery services using mobile terminals have been increasingly popular. Further, it is contemplated that additional services will become popular in the future, where a server accumulates moving image data received from mobile terminals and delivers the moving image data.

FIG. 1 is a diagram illustrating an example of a typical configuration of a conventional moving image conversion apparatus. Referring to FIG. 1, received data 100 received by the moving image conversion apparatus is demultiplexed into control data 102, image data 103, and audio data 104 by data receiver/demultiplexer 101.

Control data 102, which is information on image coding, is applied to image data decoder 105. In this connection, control data 102 may be applied to image data decoder 105 and to image data encoder 107 in some cases.

Image data 103 is applied to image data decoder 105.

Image data decoder 105 decodes image data 103 based on information derived from control data 102 to generate decoded image data, and supplies the decoded image data to switch 106.

Audio data 104 is applied to switch 106.

Switch 106 applies the decoded image data to image data encoder 107, and applies audio data 104 to data output unit 108, from the time when it is notified of the start of a conversion through conversion indication signal 109, to the time when it is notified of the termination of the conversion through conversion indication signal 109.

Image data encoder 107 encodes the decoded image data applied thereto in an intra-mode and an inter-mode to generate re-encoded image data, and applies the re-encoded image data to data output unit 108.

Data output unit 108 receives the audio data that is transferred from switch 106 and the re-encoded image data that is generated from image data encoder 107 to transfer the audio data and re-encoded image data.

Third-generation (3GPP) mobile terminals widely employ MPEG4 (ISO/IEC 14496-2:2003 "Information Technology Coding of Audio and Video Visual Objects—Part2: Visual.") as a moving image coding scheme.

MPEG4 has an intra-mode for encoding image data of a current frame using only the image data of the current frame, and an inter-mode for encoding image data of a current frame with reference to image data of a past frame as well.

In the intra-mode, input pixels which make up image data are DCT (Discrete Cosine Transform) processed in units called macro blocks, and subsequently, DCT coefficients are variable-length-encoded.

In the inter-mode, a motion compensation prediction is performed using input pixels and decoded pixels of a past frame to calculate differential pixels, and the differential pixels are DCT processed, and subsequently, motion vectors, DCT coefficients, and the like are variable-length-encoded.

When a moving image conversion apparatus is used for the accumulation and delivery of moving images, the moving image conversion apparatus cannot refer to an image of a frame prior to the first frame when it reproduces the first frame of accumulated images. Accordingly, the first frame of the accumulated images must be necessarily data encoded in the intra-mode.

In this connection, Patent Document 1 discloses a video stream editing method and apparatus for processing MPEG video streams.

This apparatus first extracts a first partial stream from MPEG video stream 1 such that an I- or P-picture takes a position of the finally displayed image, and then extracts a second partial stream from MPEG video stream 2 such that an I- or P-picture takes a position of the first displayed image.

Subsequently, this apparatus determines whether or not the first displayed picture of the second partial stream is an I-picture.

When the first displayed picture of the second partial stream is an I-picture, this apparatus leaves the first displayed picture of the second partial stream unchanged from the I-picture.

On the other hand, when the first displayed picture of the second partial stream is a P-picture, this apparatus sequentially decodes from an I-picture immediately before the P-picture to that P-picture to generate a decoded image of the P-picture. Subsequently, this apparatus again encodes the decoded image of the P-picture to generate image data of an I-picture, and substitutes the image data of the I-picture for the P-picture which is the first displayed picture of the second partial stream.

Subsequently, this apparatus combines the first partial stream with the second partial stream to generate a third stream.

Patent Document 2 in turn discloses an image accumulation/reproduction apparatus which encodes images on a frame-by-frame basis. This image accumulation/reproduction apparatus comprises encoding means, accumulating means, receiving means, control means, decoding means, intra-encoding means, and transmitting means.

The encoding means encodes macro-blocks at all positions within frames of a predefined number of frames in a predefined intra-mode at least once, and encodes macro-blocks other than the macro-blocks encoded in the intra-mode in a predefined inter-mode. The accumulating means accumulates images encoded by the encoding means.

The receiving means receives a reproduction start position from the outside for images accumulated in the accumulating means. The control means traces back from the reproduction start position, received by the receiving means, by the predefined number of frames to read images from the accumulating means. The decoding means decodes the read images to create an image frame for the reproduction start position. The intra-encoding means encodes the image frame created by the decoding means in an intra-mode. The transmitting means transmits the image frame encoded by the intra-encoding means.

Patent Document 1: JP-A-2002-300528
Patent Document 2: JP-A-2002-314940

DISCLOSURE OF THE INVENTION

Problems to be Solved by the Invention

The conventional moving image conversion apparatus described with reference to FIG. 1 constantly decodes image data received from terminals to generate decoded images. Then, this moving image conversion apparatus again encodes all decoded images, which exist from a frame at which the accumulation is started to a frame at which the accumulation is terminated, among the decoded images. This moving image conversion apparatus transfers and accumulates image data generated through the re-encoding.

In this way, the conventional moving image conversion apparatus constantly decodes received image data, and re-encodes all decoded images which have been generated from the time when it is notified of the start of a conversion to the time when it is notified of the termination of the conversion. For this reason, the conventional moving image conversion apparatus requires an immense amount of processing for the image re-encoding process. As a result, when image data on a plurality of channels are to be converted simultaneously, by way of example, a large number of DSPs (Digital Signal Processor) are required to exclusively perform the image processing, resulting in a problem that the apparatus is increased in scale.

Also, in the conventional moving image conversion apparatus, when an image frame encoded in the inter-mode is converted to an image frame in the intra-mode which is used as the first frame at the start of a conversion, the amount of codes is increased in order to ensure a similar image quality to that before the conversion. This causes a problem that the amount of image data exceeds the transmission capacity, for example, when converted image data is delivered, and the problem that the images cannot be synchronized with audio data.

The apparatuses disclosed in Patent Documents 1 and 2, and the like reduce the amount of processing as compared with the conventional moving image conversion apparatus described with reference to FIG. 1 because they do not decode or re-encode a frame in the inter-mode which follows a frame converted to the intra-mode.

However, this apparatus maintains all past image data required for decoding, in order to decode image data which are to be converted to the intra-mode, and decodes all of them after it has received the start of a conversion to the intra-mode. For this reason, this apparatus takes a long time from the reception of the start of a conversion to the intra-mode to the termination of the conversion to the intra-mode. As such, this apparatus is not suitable for application to services and the like which requires the immediacy.

The present invention has been created in view of the problems mentioned above, and its main object is to provide an apparatus, a method, a system, and a program which are capable of restraining an increase in the amount of processing to reduce the increase, and of restraining an increase in size of the apparatus.

It is another object of the present invention to provide an apparatus, a method, a system, and a program which solve a problem that converted moving images are not correctly reproduced due to an increase in the amount of codes of image data in conversion processing required to convert the moving image.

Means for Solving the Problems

A method according to one aspect of the present invention includes the steps of receiving a compression-encoded image stream, and converting a stream of an indicated frame or a stream of an indicated macro block to a stream in an intra-mode, transferring the stream in the intra-mode, and transferring received image streams as regards the image streams other than the indicated stream.

A method according to the present invention includes the steps of receiving a compression-encoded image stream, constantly decoding the image stream to derive a decoded image, converting an arbitrary frame or macro block indicated for the decoded image to a stream in an intra-mode, transferring the stream in the intra-mode, and transferring image streams that correspond to the decoded image other than the indicated arbitrary frame or macro block.

In the present invention, quantization accuracy during conversion may be controlled using at least one of, the amount of codes in the image stream, a quantization accuracy during the decoding, and a target amount of output codes.

In the present invention, the step of receiving an image stream may also include receiving audio data together with the image stream, and the method may further include the step of adjusting information on the time at which the audio data is reproduced when the amount of codes in the stream after conversion into the intra-mode changes from the amount of codes in the image before conversion into the intra-mode.

An apparatus according to another aspect of the present invention includes means for receiving a compression-encoded image stream, and means for converting a stream of an indicated frame or a stream of an indicated macro block to a stream in an intra-mode, transferring the stream in the intra-mode, and transferring received image streams as regards the image streams other than the indicated stream.

An apparatus according to the present invention includes an input unit for receiving a compression-encoded image stream, and a controller for constantly decoding the image stream to derive a decoded image, converting a frame or macro block indicated for the decoded image to a stream in an intra-mode, transferring the stream in the intra-mode, and transferring image streams that correspond to the decoded image other than the indicated frame or macro block.

In the apparatus according to the present invention, the controller controls a quantization accuracy during the conversion using at least one of, the amount of codes in the image stream, a quantization accuracy during the decoding, and a target amount of output codes. In the apparatus according to the present invention, the input unit may also receive audio data together with the image stream, and the controller may adjust information on the time at which the audio data is reproduced when the amount of codes in the stream after conversion into the intra-mode changes from the amount of codes in the image before conversion into the intra-mode.

An apparatus according to the present invention comprises a demultiplexer for receiving data to be received including at least compression-encoded image data, demultiplexing the received data into at least the image data, and transferring the image data; an image data converter for receiving the image data transferred from the demultiplexer, decoding the image data to generate a decoded image, encoding the decoded image to generate image data, and transferring the generated image data; a switch for receiving the image data transferred from the image data converter and the image data transferred from the demultiplexer, and switching image data to be transferred to one of the image data transferred from the image data converter and the image data transferred from the demultiplexer based on a conversion instruction signal applied thereto; and an output unit for receiving image data transferred from the switch to transfer the image data. The image data converter may receive the conversion instruction signal, encode a decoded image, that corresponds to a frame for which the start of conversion is notified by the conversion instruction signal, in the intra-mode to generate image data and supply the switch with the image data generated through the encoding. When the switch is notified of the start of conversion by the conversion instruction signal, the switch supplies the output unit with image data transferred from the image data converter as a frame at the start of the conversion, and supplies the output unit with image data transferred from the demultiplexer as subsequent frames to a conversion termination frame.

In the present invention, the demultiplexer may receive received data, which includes the image data, control data which is information on image encoding, and audio data, demultiplexes the received data into the control data, image data, and audio data, and transfers the control data, image data, and audio data; the image data converter may decode the image data based on information extracted from the control data to derive the decoded image, the switch may receive the audio data and supplies the audio data to the output unit from the start of conversion to the termination of conversion as notified by the conversion instruction signal, and the output unit may receive the image data and the audio data from the switch and transfers the image data and the audio data in synchronization with each other.

In the present invention, the output unit adjusts information on the time at which the audio data is reproduced when the amount of codes in the stream after conversion changes from the amount of codes in the image before the conversion.

In the present invention, the output unit may delay a timing at which the audio data is reproduced in accordance with an amount by which the amount of codes in the converted image data increases from the amount of codes in the image data before the conversion. In the present invention, the output unit may insert mute data into an area of the audio data that corresponds to the beginning of the frame at which the conversion is started.

In the present invention, the image data converter may comprise an image decoder, a code amount controller, and an image encoder, wherein the image decoder may receive the image data transferred from the demultiplexer, decode the image data to generate a decoded image, and supply the code amount controller with a decoding quantization accuracy detected during decoding and the amount of received codes in units of received frames, in units of macro blocks, or in units of video packets, and wherein the code amount controller may determine an encoding quantization accuracy using at least one of, the decoding quantization accuracy from the image decoder, the amount of received codes, and a target amount of codes applied thereto, and may supply the encoding quantization accuracy to the image encoder, and wherein the image encoder may encode the decoded image in accordance with the encoding quantization accuracy from the code amount controller to generate the image data and transfer the generated image data.

A computer program according to another aspect of the present invention causes a computer, which forms a moving image conversion apparatus, to execute processing to receive a compression-encoded image stream, and processing to constantly decode the image stream to derive a decoded image, to convert an arbitrary frame or macro block indicated for the decoded image to a stream in an intra-mode, to transfer the stream in the intra-mode, and to transfer image streams that correspond to the decoded image other than the indicated arbitrary frame or macro block.

The computer program according to the present invention may further cause the computer to execute processing to control quantization accuracy during conversion using at least one of, the amount of codes in the image stream, a quantization accuracy during the decoding, and a target amount of output codes.

In the computer program according to the present invention, processing to receive an image stream may also receive audio data together with the image stream, and the program may further cause the computer to execute processing to adjust information on a time at which the audio data is reproduced when the amount of codes in the stream after conversion into the intra-mode changes from the amount of codes in the image before conversion into the intra-mode.

Effects of the Invention

According to the present invention, an image of a specified frame or macro block is converted to a stream in the intra-mode, and the stream in the intra-mode is transferred, while received images are transferred with respect to the remaining image data, thereby reducing the processing in image encoding required to convert moving images. According to the present invention, the amount of processing can be reduced to prevent an increase in the size of the apparatus. Also, according to the present invention, moving images on a larger number of channels can be simultaneously converted than in the case of conventional schemes.

Also, according to the present invention, quantization accuracy during conversion can be controlled such that the amount of codes in converted moving images does not exceed the capacity of a transmission path, and information regarding the audio data reproduction time can be adjusted in accordance with the increased amount of codes so as not to lose the synchronization of image with sound. Accordingly, it is possible to avoid a problem in which converted moving images cannot be correctly reproduced due to an increase in the amount of codes in image data, caused by the conversion processing that is required to convert the moving images.

Further, according to the present invention, compression-encoded image data is constantly decoded to generate decoded images, such that the decoded image is converted to a stream in the intra-mode when conversion is instructed by a conversion instruction signal. Consequently, it is possible to reduce the time between the issuing an instruction to convert to a stream in the intra-mode to the time when conversion into the intra-frame is terminated.

Figure 1:
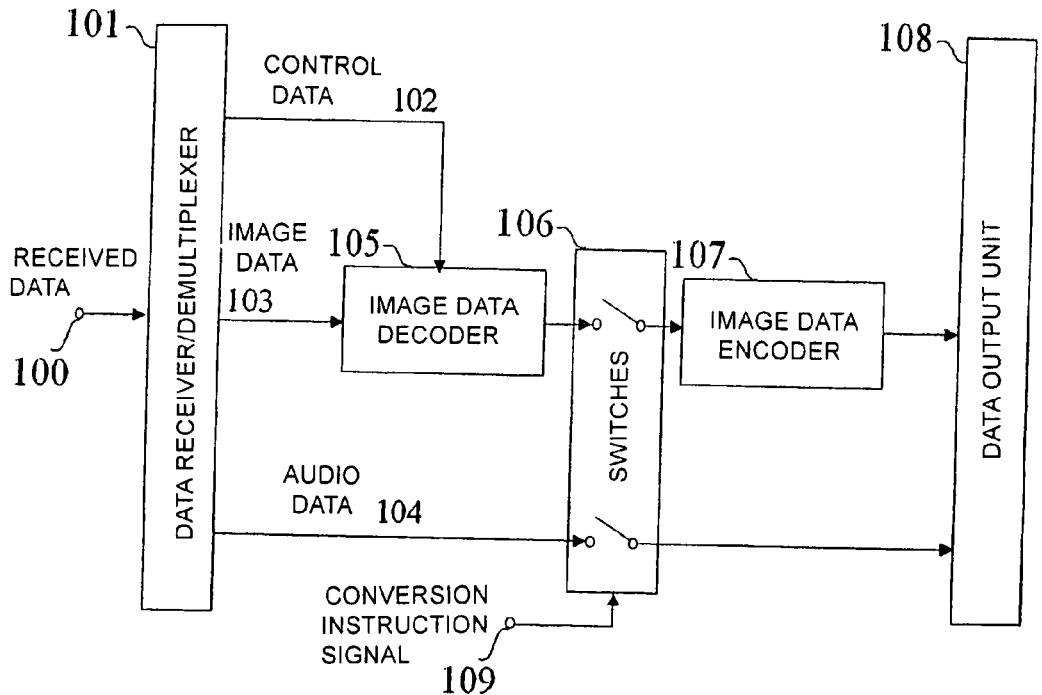
FIG. 1 is a diagram illustrating an example of a typical configuration of a conventional apparatus.

A diagram for describing a data synchronization adjustment in one embodiment of the present invention.

[FIG. 4B]

A diagram for describing a data synchronization adjustment in one embodiment of the present invention.

DESCRIPTION OF REFERENCE NUMERALS

100 Received Data
101, 201 Data Receiver/Demultiplexer
102 Control Data
103 Image Data
104 Audio Data
105 Image Data decoder
106, 206 Switches 107 Image Data Encoder
108 Data Output Unit
109 Conversion Instruction Signal
205 Image Data Converter
208 Data Synchronization/Output Unit
301 Image Decoder
302 Decoding Quantization Accuracy
303 Amount of Received Codes
304 Amount of Target Codes
305 Code Amount Controller
306 Encoding Quantization Accuracy
307 Image Encoder

BEST MODE FOR CARRYING OUT THE INVENTION

To describe the present invention discussed above in greater detail, the present invention will be described with reference to the accompanying drawings. In the present invention, image data converter 205 converts image data of a frame (conversion start frame) concerning which the start of conversion is notified, among image data provided from data receiver/demultiplexer 201, into an intra-mode, and transfers the result of the conversion through switch 206. For image data other than the conversion start frame, switch 206 transfers image data provided from data receiver/demultiplexer 201.

Also, in the present invention, data synchronization/output unit 208 adjusts the audio reproduction time when the size of image data after conversion into the intra-mode has increased beyond the size of the image data before converted into the intra-mode, so as not to lose synchronization of image with sound. For example, data synchronization/output unit 208 temporally shifts the audio data reproduction timing backward to delay the timing such that the image is synchronized with the sound.

Further, in the present invention, image data converter 205 which receives image data from data receiver/demultiplexer 201 constantly decodes the image data to derive decoded images, and converts a decoded image derived at the time when the start of a conversion is instructed by a conversion instruction signal, in other words, a decoded image corresponding to a frame or a macro block concerning which the start of the conversion is notified by the conversion instruction signal, to a stream in the intra-mode. Such a configuration enables a period to be reduced from the time, when conversion into the intra-mode is instructed, to the time when the conversion to the intra-mode is terminated.

A method according to the present invention includes, for example, the following steps.

Step 1: Data receiver/demultiplexer 201 demultiplexes an image stream from received data which includes at least a compression-encoded image stream, and supplies the demultiplexed image stream to image data converter 205.

Step 2: Image data converter 205 constantly decodes the image stream to derive a decoded image on a frame-by-frame basis, and converts arbitrary frames or macro blocks indicated for the decoded image to a stream in the intra-mode. In this event, switch 206 transfers the stream in the intra-mode converted by image data converter 205.

Step 3: For image streams corresponding to decoded images other than the indicated arbitrary frames or macro blocks, switch 206 transfers image streams demultiplexed by data receiver/demultiplexer 201.

In the method according to the present invention, data synchronization/output unit 208, upon transfer of data, may adjust information on an audio reproduction time when the amount of image codes after the conversion changes from the amount of codes before conversion. In the following, a description will be given in conjunction with an embodiment.

Embodiment

Figure 2:
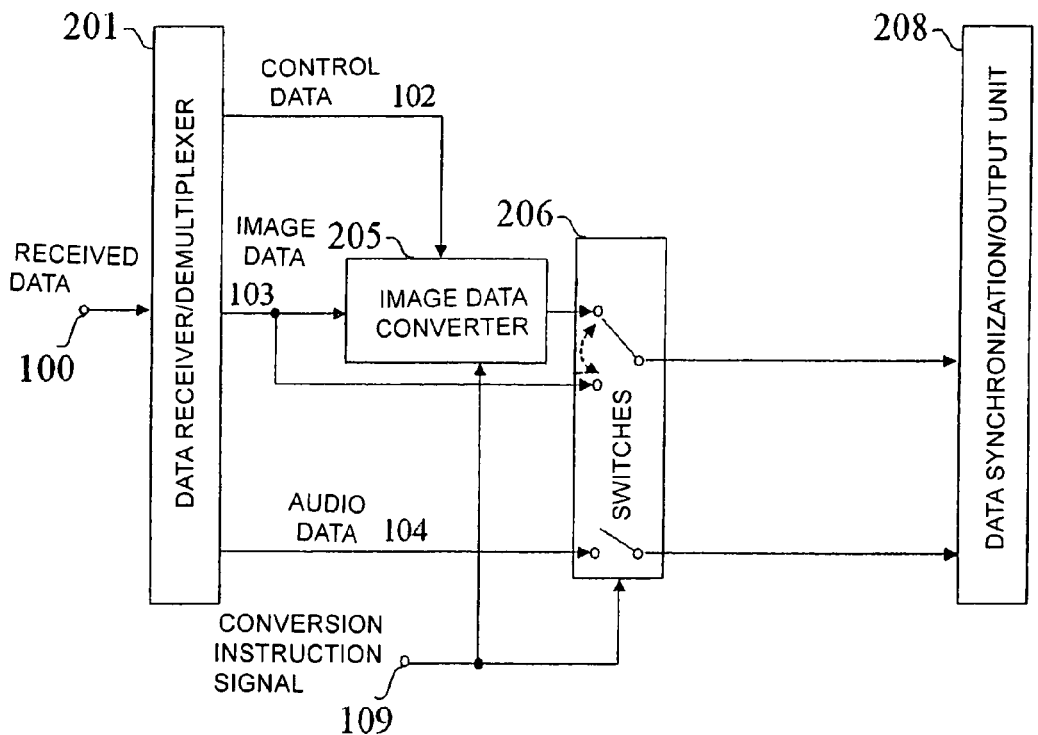
FIG. 2 is a diagram illustrating the configuration of one embodiment of the present invention.

FIG. 2 is a diagram illustrating the configuration of one embodiment of the present invention. Referring to FIG. 2, a moving image conversion apparatus according to this embodiment comprises data receiver/demultiplexer 201, image data converter 205, switch 206, and data synchronization/output unit 208.

Data receiver/demultiplexer 201 is an example of an input unit. Also, image data converter 205, switch 206, and data synchronization/output unit 208 make up a controller.

Received data (stream) 100, which has been compression encoded and transmitted, includes compression-encoded image data (stream) 103, control data 102 which is information on image encoding, and audio data 104 synchronized with image data 103. Received data 100 is applied to data receiver/demultiplexer 201.

Data receiver/demultiplexer 201 demultiplexes received data 100 into control data 102, image data 103, and audio data 104.

Data receiver/demultiplexer 201 provides control data 102 to image data converter 205.

Data receiver/demultiplexer 201 provides image data 103 to image data converter 205 and switch 206.

Data receiver/demultiplexer 201 provides audio data 104 to switch 206.

Image data converter 205 constantly decodes image data 103 based on information extracted from control data 102 to derive a decoded image on a frame-by-frame basis.

Further, image data converter 205 encodes a decoded image of a frame (arbitrary frame), concerning which the start of a conversion is notified by conversion instruction signal 109, in the intra-mode (re-encoding processing), and supplies the image data generated by the encoding (stream in the intra-mode) to switch 206.

Image data converter 205 uses a frame (decoded image), which is derived when the start of the conversion is notified by conversion instruction signal 109 as a frame concerning which the start of the conversion is notified (an arbitrary frame indicated for the decoded image).

In this connection, the decoded image of the frame concerning which the start of the conversion is notified by conversion instruction signal 109 is composed, for example, of a plurality of macro blocks. In this event, image data converter 205 uses a macro block included in a frame (decoded image) derived when the start of the conversion is notified by conversion instruction signal 109 as a macro block concerning which the start of the conversion is notified (an arbitrary macro block indicated for the decoded image).

Image data converter 205 utilizes, for example, a predefined fixed value, or a Q-value during decoding as a quantization accuracy (generally called the "Q-value") in the event of encoding in the intra-mode. Alternatively, image data converter 205 controls the quantization accuracy in the event of encoding in the intra-mode in accordance with code amount control as shown in FIG. 3.

Figure 3:
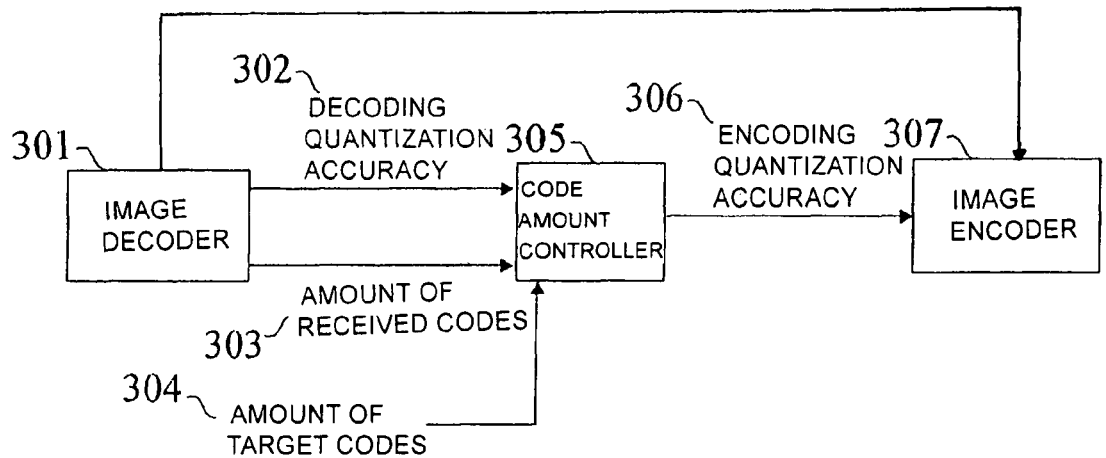
FIG. 3 is a diagram illustrating an exemplary configuration of an image data converter in one embodiment of the present invention.

FIG. 3 is a diagram illustrating the configuration of image data converter 205 in FIG. 2. Referring to FIG. 3, image data converter 205 comprises image decoder 301, code amount controller 305, and image encoder 307.

Image decoder 301 constantly decodes image data 103 based on information extracted from control data 102 to derive a decoded image on a frame-by-frame basis, and provides the decoded image for each frame to image encoder 307.

Image decoder 301 also supplies code amount controller 305 with decoding quantization accuracy 302, which is attained upon decoding of image data 103, and received code amount (the amount of codes in a received image stream) 303 in units of received frames, in units of macro blocks or in units of video packets which are a collection of macro blocks.

Code amount controller 305 determines encoding quantization accuracy 306, using at least one of, decoding quantization accuracy 302, received code amount 303 and applied target code amount 304 and supplies the determined encoding quantization accuracy 306 to image encoder 307.

Image encoder 307 receives conversion instruction signal 109, and encodes a decoded image of a frame or a macro block concerning which the start of the conversion is notified by conversion instruction signal 109, in the intra-mode in accordance with encoding quantization accuracy 306, and supplies switch 206 with image data (stream in the intra-mode) generated through encoding.

In this connection, image encoder 307 uses a frame (decoded image), derived from image decoder 301 when the start of the conversion is notified by conversion instruction signal 109, as a frame concerning which the start of the conversion is notified.

Alternatively, image decoder 307 uses a macro block, which forms part of a frame (decoded image) derived from image decoder 301 when the start of the conversion is notified by conversion instruction signal 109, as a macro block concerning which the start of the conversion is notified.

Decoding quantization accuracy 302 is a parameter which is produced during decoding in image decoder 301, and constitutes useful information when the encoding is controlled in image encoder 307 such that the amount of codes in a encoded frame approaches target code amount 304. For example, when received code amount 303 is larger than target code amount 304, code amount controller 305 conducts control to lower encoding quantization accuracy 306 below decoding quantization accuracy 302.

When the amount of codes in image data generated through the encoding in the intra-mode exceeds target code amount 304, even if encoding quantization accuracy 306 is increased to the maximum, code amount controller 305 may set some of the higher order values of DCT coefficients to zero during encoding in image encoder 307 to reduce the amount of codes generated by image encoder 307.

Since encoding quantization accuracy 306 is controlled, the amount of codes in moving images including frames encoded by image encoder 307 can be prevented from exceeding the capacity of a transmission path.

Referring again to FIG. 2, switch 206 selects output data of image data converter 205 (stream in the intra-mode) as the first frame at the start of the conversion, when the start of the conversion is notified by conversion instruction signal 109, and supplies the selected output data to data synchronization/output unit 208.

Switch 206 also supplies data synchronization/output unit 208 with image data (stream) 103 transferred from data receiver/demultiplexer 201, instead of output data of image data converter 205, as a stream corresponding to frames from the frame next to the first frame at the start of the conversion to the frame at which the conversion is terminated. For reference, switch 206 uses image data 103 received from data receiver/demultiplexer 201 when the termination of the conversion is notified by conversion instruction signal 109, as a conversion termination frame.

Also, switch 206 supplies data synchronization/output unit 208 with audio data 104 which is received from data receiver/demultiplexer 201 from the time when the start of the conversion is notified by conversion instruction signal 109 to the time when the termination of the conversion is notified by conversion notification signal 109.

Data synchronization/output unit 208 adds temporal information, based on the time at which data receiver/demultiplexer 201 received data 100, to a stream in the intra-mode received from image data converter 205, and transfers the stream in the intra-mode to which the temporal information has been added.

In this event, since the image data is encoded in the intra-mode, the amount of codes in the image data of the conversion start frame is often increased beyond the amount of codes when the image data was received by data receiver/demultiplexer 201. For this reason, when the image is synchronized with sound at the conversion start time, the image is displayed with a delay.

Figure 4A:
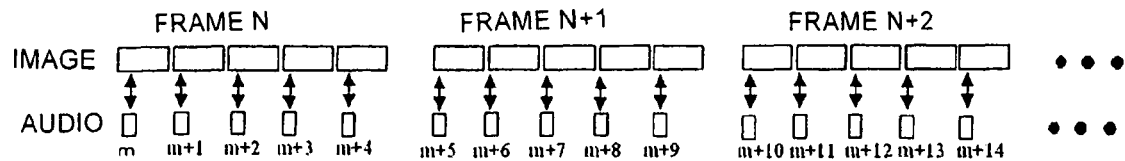
[FIG. 4A]
Figure 4B:
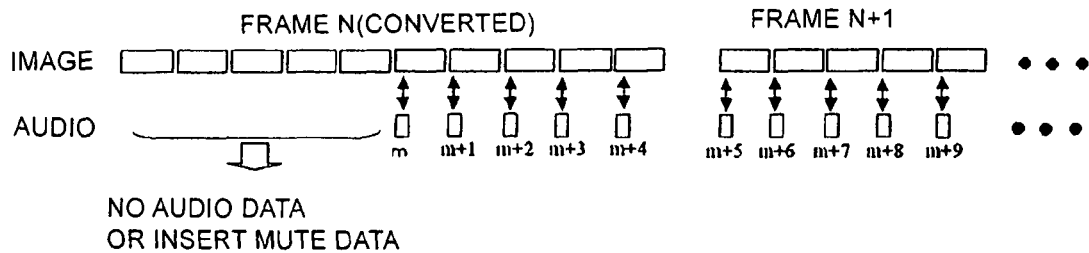

Thus, as illustrated in FIG. 4B, data synchronization/output unit 208 shifts backward the audio data reproduction timing that corresponds to the conversion start frame of the image data; stated another way, data synchronization/output unit 208 makes an adjustment to delay the audio data reproduction timing to establish synchronization of image with sound. In this event, if a problem arises during reproduction when there exists no audio data that corresponds to the beginning of the image, data synchronization/output unit 208 inserts, for example, mute data as audio data that corresponds to the beginning of the image.

In this connection, FIG. 4A is a diagram schematically representing a temporal relationship between the image and sound when data receiver/demultiplexer 201 receives data 100 to be received. FIG. 4B is a diagram schematically representing a temporal relationship between the image and sound transferred from data synchronization/output unit 208.

Data synchronization/output unit 208 encodes frame N of image data in the intra-mode to temporally move backward audio data m, m+1, m+2, m+3, m+4 corresponding to frame N of image data by a time consistent with the amount of codes that have increased beyond the amount of codes that were originally received.

Stated another way, data synchronization/output unit 208 temporarily moves audio data m, m+1, m+2, m+3, m+4 corresponding to frame N of the image data after the conversion in the intra-mode backward to an extent that the audio data are synchronized with frame N of the converted image data. In frame N upon transfer in FIG. 4B, no audio data exists at the positions of audio data m through m+4 in frame N upon reception in FIG. 4A. Data synchronization/output unit 208 may insert mute data in this portion in which no audio data exists.

It should be noted that, in the moving image conversion apparatus of the foregoing embodiment, the processing and function of respective data, receiver/demultiplexer 201, image data converter 205, switch 206 and data synchronization/output unit 208 may be implemented by a program executed on a CPU (computer) which forms part of the moving image conversion apparatus.

For example, a program which defines the processing and function of respective data receiver/demultiplexer 201, image data converter 205, switch 206 and data synchronization/output unit 208 is recorded on a computer readable recording medium (for example, a memory), and the CPU which forms part of the moving image conversion apparatus reads the program from the recording medium for execution.

Also, the moving image conversion apparatus of the foregoing embodiment may be combined with another communications apparatus to comprise a system, or may be applied to a server or the like to accumulate and deliver moving images, as a matter of course.

While the present invention has been described above in conjunction with the embodiment, it goes without saying that the present invention is not limited only to the configuration of the embodiment, but encompasses a variety of alterations and modifications which can be made by those skilled in the art within the scope of the present invention.

The invention claimed is:

1. A moving image conversion method, comprising:
   receiving a compression-encoded image stream, said image stream including audio data;
   constantly decoding the image stream to derive decoded images, converting an indicated arbitrary frame or macro block in a decoded image from among the decoded images to a converted stream in an intra-mode, transferring the converted stream in the intra-mode, and transferring a first part of the image stream but not a second part of the image stream that is used to derive the decoded image; and
   upon an increase in a first amount of codes in the converted stream in the intra-mode over a second amount of codes in the second part of the image steam, adjusting information on a time, at which the audio data is reproduced, in accordance with an amount by which the first amount of codes increases over the second amount of codes, such that the converted stream in the intra-mode and the first part of the image stream synchronize with the audio data by delaying the time at which the audio data is reproduced.

2. The moving image conversion method according to claim 1, further comprising a step of controlling a quantization accuracy during the conversion using at least one of: the amount of codes in the image stream, a quantization accuracy during the decoding, and a target amount of output codes.

3. The moving image conversion method according to claim 2, wherein, in said adjusting step, a timing at which the audio data is reproduced is delayed in accordance with an amount by which the amount of codes in the converted image stream increases from the amount of codes in the image stream before the conversion.

4. A moving image conversion apparatus, comprising:
   an input unit for receiving a compression-encoded image stream and audio data together with the image stream; and
   a controller configured to constantly decode the image stream to derive decoded images, converting an indicated arbitrary frame or macro block in a decoded image from among the decoded images to a stream in an intra-mode, transferring the converted stream in the intra-mode, and transferring a first part of the image stream but not a second part of the image stream that is used to derive the decoded image,
   said controller further configured to, upon an increase in a first amount of codes in the converted stream in the intra-mode over a second amount of codes in the second part of the image steam, adjust information on a time, at which the audio data is reproduced, in accordance with an amount by which the first amount of codes increases over the second amount of codes, such that the converted stream in the intra-mode and the first part of the image stream synchronize with the audio data by delaying the time at which the audio data is reproduced.

5. The moving image conversion apparatus according to claim 4, wherein said controller controls a quantization accuracy during conversion using at least one of: the amount of codes in the image stream, a quantization accuracy during the decoding, and a target amount of output codes.

6. The moving image conversion method according to claim 4, wherein said controller delays a timing at which the audio data is reproduced in accordance with an amount by which the amount of codes in the converted image data increases from the amount of codes in the image data before the conversion.

7. A moving image conversion apparatus, comprising:
   a demultiplexer for receiving data to be received including at least compression-encoded image data, demultiplexing the received data into at least the image data, and transferring the image data;
   an image data converter for receiving the image data transferred from said demultiplexer, decoding the image data to generate a decoded image, encoding the decoded image to generate image data, and transferring the generated image data;
   a switch for receiving the image data transferred from said image data converter and the image data transferred from said demultiplexer, and switching image data to be transferred to either the image data transferred from said image data converter or the image data transferred from said demultiplexer based on a conversion instruction signal applied thereto; and
   an output unit for receiving image data transferred from said switch and for transferring the image data,
   wherein said image data converter receives the conversion instruction signal, encodes a decoded image that corresponds to a frame in an intra-mode, concerning which the start of a conversion is notified by the conversion instruction signal so as to generate image data, and supplies said switch with the image data generated through the encoding,
   wherein, when said switch is notified of the start of the conversion by the conversion instruction signal, said switch supplies said output unit with image data transferred from said image data converter as a frame at the start of the conversion, and supplies said output unit with image data transferred from said demultiplexer as subsequent frames to a conversion termination frame,
   wherein said demultiplexer receives data to be received which includes the image data, control data which is information on image encoding, and audio data, demultiplexes the received data into control data, image data and audio data, and transfers the control data, the image data, and the audio data,
   wherein said image data converter decodes the image data based on information extracted from the control data to derive the decoded image,
   wherein said switch receives the audio data, and supplies the audio data to said output unit from the start of the conversion to the termination of the conversion that are notified by the conversion instruction signal,
   wherein said output unit receives the image data and the audio data from said switch, and transfers the image data and the audio data in synchronization with each other,
   said output unit adjusts information on a time, at which the audio data is reproduced, in accordance with an amount by which a first amount of codes in a converted stream generated by the image data converter increases over a second amount of codes of a corresponding non-converted stream of image data from said demultiplexer used by the image data converter to generate the converted stream, such that the converted stream output from the image data converter in the intra-mode and a first part of an image stream from the demultiplexer synchronize with the audio data by delaying the time at which the audio data is reproduced.

8. The moving image conversion apparatus according to claim 7, wherein said output unit delays a timing at which the audio data is reproduced in accordance with an amount by which the amount of codes in the converted image data increases from the amount of codes in the image data before the conversion.

9. The moving image conversion apparatus according to claim 8, wherein said output unit inserts mute data into an area of the audio data that corresponds to the beginning of the frame at which the conversion is started.

10. A program recorded upon a non-transient computer-readable medium, the program being executable for causing a CPU of a computer which forms part of a moving image conversion apparatus to execute:
   processing to receive a compression-encoded image stream and an audio data together with the image stream;
   processing to constantly decode the image stream to derive decoded images, to convert an indicated arbitrary frame or macro block in a decoded image from among the decoded images to a stream in an intra-mode, to transfer the converted stream in the intra-mode, and to transfer a first part of the image stream but not a second part of the image stream that is used to derive the decoded image; and
   processing to adjust information on a time, at which the audio data is reproduced, when an increase in a first amount of codes in the converted stream in the intra-mode is detected over a second amount of codes in the second part of the image steam, the adjustment being in with an amount by which the first amount of codes increases over the second amount of codes, such that the converted stream in the intra-mode and the first part of the image stream synchronize with the audio data by delaying the time at which the audio data is reproduced.

11. The program according to claim 10, further causing the computer to execute processing to control a quantization accuracy during conversion using at least one of, the amount of codes in the image stream, a quantization accuracy during the decoding, and a target amount of output codes.

12. The moving image conversion method according to claim 10, wherein said processing to adjust information on the time at which the audio data is reproduced delays a timing at which the audio data is reproduced in accordance with an amount by which the amount of codes in the converted image data increases from the amount of codes in the image data before the conversion.

* * * * *